Jan. 16, 1962 K. W. BOOTHE 3,016,796
ADJUSTABLE FLOATER FOR SPECTACLES
Filed Oct. 20, 1960
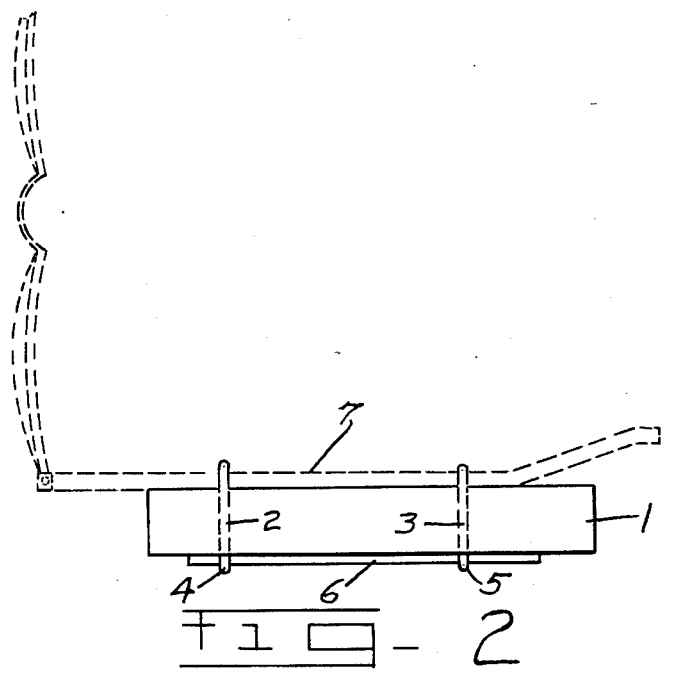
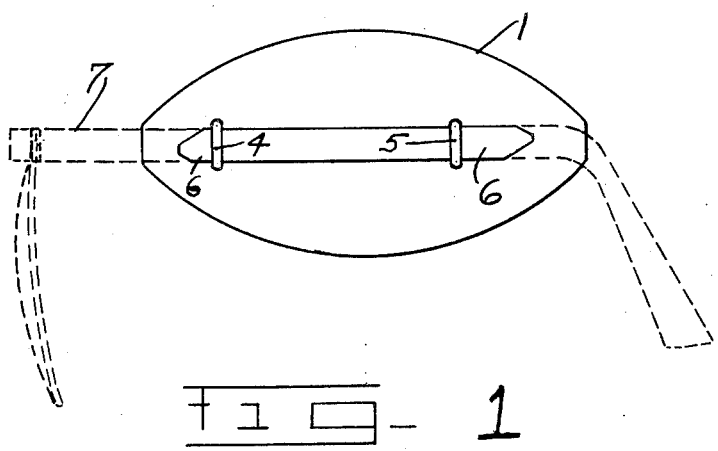
INVENTOR
Kenneth W. Boothe
BY Chas. Denegre
Attorney

United States Patent Office 3,016,796
Patented Jan. 16, 1962

3,016,796
ADJUSTABLE FLOATER FOR SPECTACLES
Kenneth W. Boothe, Montgomery, Ala.
(P.O. Box 567, Craig Air Force Base, Selma, Ala.)
Filed Oct. 20, 1960, Ser. No. 63,757
4 Claims. (Cl. 88—41)

This invention relates to an adjustable floater for spectacles. It has for its main objects to provide such a floater that will be highly satisfactory for the purpose intended, easy to use and keep in serviceable condition, simple in structure, cheap to produce, and extremely durable.

A further object is to provide such a floater to use when the user is on or near water, or in any position where the spectacles may fall into any kind of fluid and become damaged or lost.

Other objects and advantages will appear from the drawing and specification.

By referring generally to the drawing it will be observed that—

FIG. 1 is a side elevational view of a floater made according to this invention removably attached on a side retaining bar of spectacles.

FIG. 2 is a plan view showing the floater on the bar.

Similar reference numerals refer to similar parts throughout the two views.

Referring to the drawing in detail it will be seen that the floater comprises a body 1 made of any light material that will float in water, such as cork, plastic, light wood, or the like. The body is provided with slots 2 and 3 through which rubber bands 4 and 5 are inserted. Then a pin 6 made of light material is inserted through the outer end portions of the rubber bands to thus hold the body firmly adjacent the spectacle bar 7 that has been inserted through the rubber bands.

From the foregoing it will appear that the device is easy to adjust for use on an ear bar of spectacles and removed when no longer required. When not in use a bar of any kind is inserted through the loops of rubber bands in place of the spectacle bar.

The structure may be made of any material suitable for the purpose, but I prefer to use cork, plastic, light wood or the like for the body, rubber bands for inserting through the slots, and light material such as plastic for the pin; also the parts may be made in different sizes and capacities depending on the sizes of spectacles on which to be used.

While I have shown and described the preferred embodiment of my invention, I do not wish to limit same to the exact and precise details of structure, and I reserve the right to make all modifications and changes so long as they remain within the scope of the invention and the following claims.

Having described my invention I claim:

1. An adjustable floater for spectacles comprising, a body made of cork, said body being of a size and shape to fit removably on the outside of an ear bar of a spectacle frame, two slots, said slots being formed through said body and spaced apart, two rubber bands, said bands being inserted through said slots and being of sufficient length to have an end of each fit removably around an ear bar of a spectacle frame, a bar made of stiff material, said bar being of a size to be inserted through the outer end portions of the said rubber bands when adjacent the outer face of said body when it is in position for use.

2. An adjustable floater for spectacles comprising, a body made of plastic, said body being of a size and shape to fit removably on the outside of an ear bar of a spectacle frame, two slots, said slots being formed through said body and spaced apart, two rubber bands, said bands being inserted through said slots and being of sufficient length to have an end of each fit removably around an ear bar of a spectacle frame, a bar made of stiff material, said bar being of a size to be inserted through the outer end portions of the said rubber bands when adjacent the outer face of said body when it is in position for use.

3. An adjustable floater for spectacles comprising, a body made of light wood, said body being of a size and shape to fit removably on the outside of an ear bar of a spectacle frame, two slots, said slots being formed through said body and spaced apart, two rubber bands, said bands being inserted through said slots and being of sufficient length to have an end of each fit removably around an ear bar of a spectacle frame, a bar made of stiff material, said bar being of a size to be inserted through the outer end portions of the said rubber bands when adjacent the outer face of said body when it is in position for use.

4. An adjustable floater for spectacles comprising, a body made of floatable material, said body being of a size and shape to fit removably on the outside of an ear bar of a spectacle frame, two slots, said slots being formed through said body and spaced apart, two rubber bands, said bands being inserted through said slots and being of sufficient length to have an end of each fit removably around an ear bar of a spectacle frame, a bar made of stiff material, said bar being of a size to be inserted through the outer end portions of the said rubber bands when adjacent the outer face of said body when it is in position for use.

References Cited in the file of this patent
FOREIGN PATENTS
829,813    Germany _____ Jan. 28, 1952